United States Patent

Sato

[15] 3,643,038

[45] Feb. 15, 1972

[54] MAGNETIC RECORDING AND/OR REPRODUCING SYSTEM

[72] Inventor: Seiji Sato, Yokohama-shi, Japan

[73] Assignee: Sony Corporation, Tokyo, Japan

[22] Filed: Nov. 6, 1969

[21] Appl. No.: 874,567

[30] Foreign Application Priority Data

Nov. 9, 1968 Japan....................................43/81673

[52] U.S. Cl..........................................................179/100.2 T
[51] Int. Cl........................................G11b 5/52, G11b 21/04
[58] Field of Search.............................179/100.2 T, 100.2 Z; 178/6.6 A

[56] References Cited

OTHER PUBLICATIONS

Johnson, R. B. et al, "Automatic Tape Threading", IBM Technical Disclosure Bulletin, Vol. 9, No. 8, Jan. 1967, p. 968, Copy W179/100.2 Z

*Primary Examiner*—Maynard R. Wilbur
*Assistant Examiner*—William W. Cochran
*Attorney*—Lewis H. Eslinger, Alvin Sinderbrand and Curtis, Morris & Safford

[57] ABSTRACT

In a magnetic recording and/or reproducing system, for example, a video tape recorder of the type in which, during recording or reproducing, the magnetic tape is wrapped about a guide drum to a predetermined angular extent and is longitudinally advanced while a rotated magnetic head traverses the tape in skew or oblique tracks thereacross, a device is provided for automatically wrapping the tape about the guide drum at the initiation of the recording or reproducing operation. Such device for wrapping the tape about the guide drum is controlled to avoid its repeated operation in the event of successive recording or reproducing operations. Further, in the event of rewinding of the tape, or opening of a cover or lid provided for the tape recorder, the device automatically unwraps the tape from about the guide drum.

25 Claims, 21 Drawing Figures

INVENTOR.

SEIJI SATO

BY

ATTORNEYS

INVENTOR.
SEIJI SATO

BY

ATTORNEYS

FIG. 6
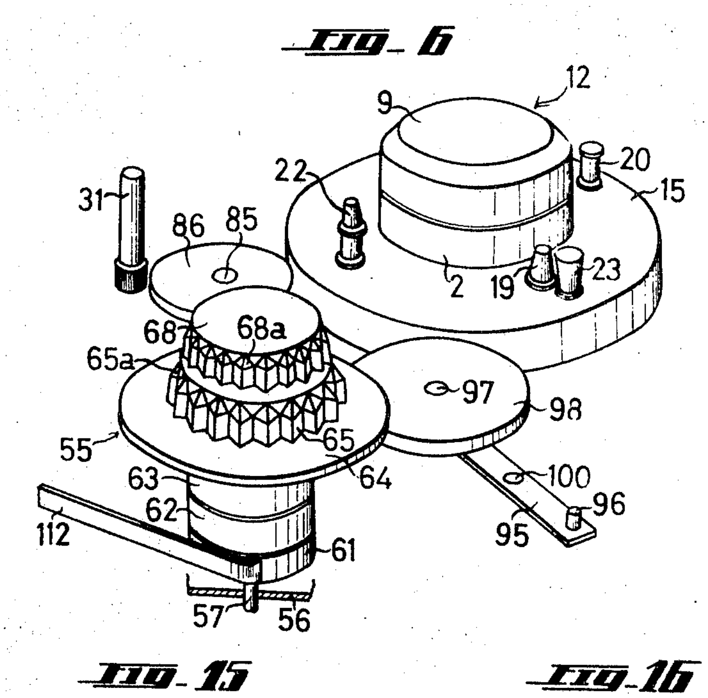
FIG. 15 FIG. 16
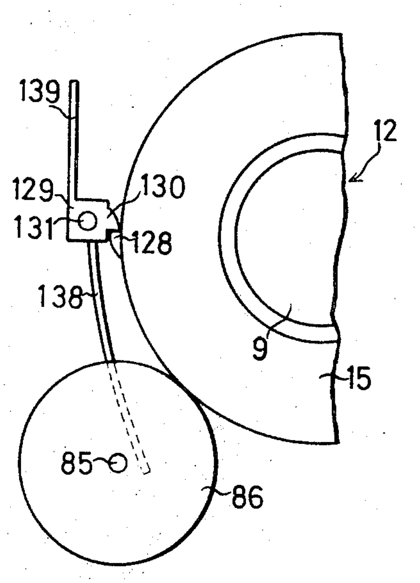
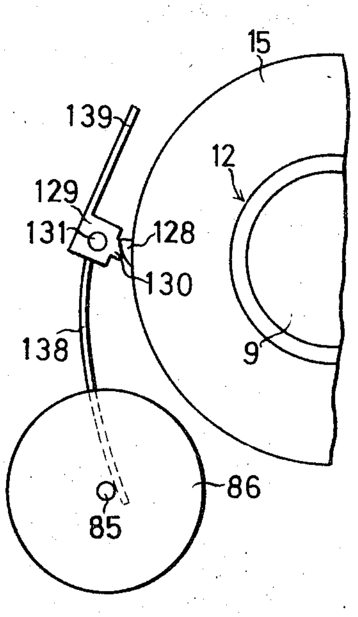
INVENTOR.
SEIJI SATO
BY Louis H. Seligman
ATTORNEYS

INVENTOR.
SEIJI SATO

BY

ATTORNEYS

INVENTOR.
SEIJI SATO

BY

ATTORNEYS

INVENTOR.
SEIJI SATO

BY

ATTORNEYS

MAGNETIC RECORDING AND/OR REPRODUCING SYSTEM

This invention relates generally to magnetic recording and/or reproducing systems, and more particularly is directed to improvements in magnetic tape recorders of the type in which the magnetic tape is traversed in skew or oblique tracks by a rotary magnetic head while the tape is advanced longitudinally around a guide drum which is concentric with the axis of rotation of the head and about which the tape is wrapped to a predetermined angular extent.

In existing magnetic recording and reproducing systems of the described type, for example, in video tape recorders, the wrapping or winding of the tape about the guide drum in preparation for the recording or reproducing or playback of signals on the tape, and the unwrapping or unwinding of the tape from the guide drum have to be performed manually, and such manually performed wrapping and unwrapping operations are difficult and annoying to perform. Further, when the tape is manually wrapped about the guide drum, it is difficult to effect the wrapping at a uniform angle with respect to a plane normal to the guide drum axis.

Accordingly, it is an object of this invention to provide a magnetic recording and/or reproducing system of the described type with a device by which the wrapping and unwrapping of the magnetic tape with respect to the guide drum are effected automatically.

Another object is to provide a device, as aforesaid, by which the magnetic tape is automatically wrapped about the guide drum at a precisely predetermined angle to the axis of the latter in response to the initiation of the operation of the magnetic tape recorder for either the recording or reproducing of signals on the tape.

Still another object is to provide a device, as aforesaid, which avoids further wrapping of the tape about the guide drum in the event that the tape is already wrapped thereabout, for example, as when the magnetic tape recorder is actuated to provide successive recording or reproducing operations thereof.

A further object is to provide a device, as aforesaid, which is controlled to effect automatic unwrapping of the magnetic tape from the guide drum upon the initiation of the operation of the magnetic tape recorder to effect rewinding of the tape upon the supply reel.

In accordance with an aspect of this invention, an automatic tape wrapping and unwrapping device for a magnetic tape recorder of the described type comprises a plurality of tape guiding members spaced radially from the guide drum and carried by rotatable support means for orbital movement of the tape guiding members around the guide drum, and mechanisms to effect a predetermined rotational movement of the support means selectively in one direction for causing the tape guiding members to wrap the tape about the drum to a predetermined angular extent and in the opposite direction to unwrap the tape from the drum.

It is a further feature of the invention to provide the magnetic tape recorder with a cover that can be opened, as when a tape cassette containing the magnetic tape is to be exchanged, and further to cause the automatic tape wrapping and unwrapping device to effect unwrapping of the tape from the guide drum in response to such opening of the cover.

The above, and other objects, features and advantages of the invention, will be apparent in the following detailed description of an illustrative embodiment thereof which is to be read in connection with the accompanying drawings, wherein:

FIG. 6 is a perspective view of the assembly shown on FIGS. 1 and 2, and of mechanisms that are associated therewith for supporting a tape cassette and for effecting the tape wrapping and unwrapping operations of the device according to this invention;

FIGS. 15 and 16 are fragmentary plan views illustrating a modified arrangement for preventing the repetitive wrapping of the tape about the guide drum by a device according to this invention.

Figure 1:
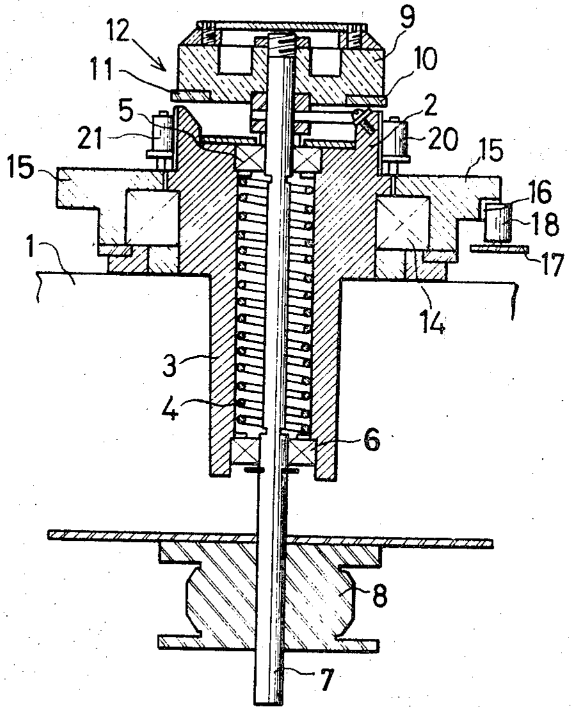
FIG. 1 is a vertical sectional view taken through the axis of the guide drum and rotary magnetic head of a magnetic tape recorder provided with an automatic tape wrapping and unwrapping device according to an embodiment of this invention.

Referring to the drawings in detail, and initially to FIG. 1 thereof, it will be seen that a magnetic tape recorder according to this invention has a baseplate or deck 1 in which there is fixedly mounted a generally tubular bearing housing 3 arranged with its axis extending vertically, and having a cylindrical upper end portion 2 which defines the lower part of a guide drum. A coil spring 4 is disposed within bearing housing 3 and acts, at its opposite ends, against bearings 5 and 6 which are thus positioned within the upper and lower end portions of the bearing housing to rotatably support a shaft 7 extending therethrough. A pulley 8 is secured on the lower end of shaft 7 and is intended to be driven by a belt from a suitable motor (not shown). An upper guide drum portion 9 is secured on the upper end of shaft 7 for rotation with the latter and has an outer diameter substantially equal to that of the lower guide drum part 2. Secured to the lower face of drum portion 9, at diametrically opposed locations, are a rotary magnetic head 10 and a balancing weight 11. It will be seen that the outer cylindrical surfaces of parts 2 and 9 cooperate to define a guide drum 12, and that the magnetic head 10, in response to rotation of shaft 7, is made to move in a rotary path that is substantially midway between the top and bottom of the cylindrical surface of guide drum 12.

Figure 4:
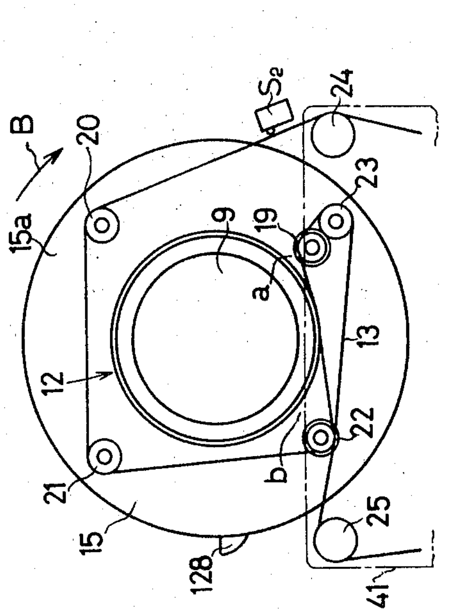
FIG. 4 is a view similar to that of FIG. 2, but showing the tape wrapped about the guide drum.
Figure 2:
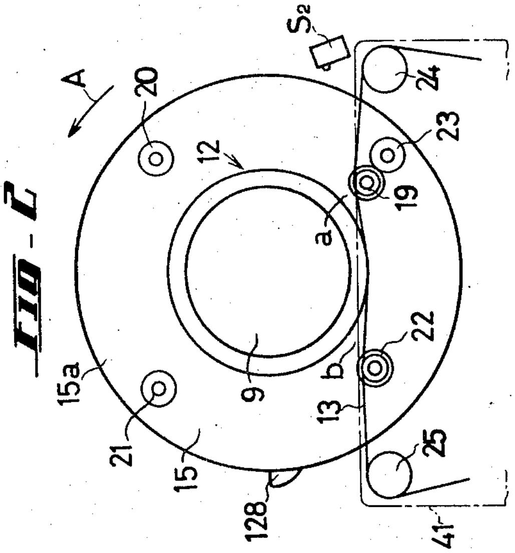
FIG. 2 is a top plan view of the assembly illustrated by FIG. 1, and with the tape being shown in its unwrapped condition.

A bearing 14 is mounted around bearing housing 3 above base plate 1 and serves to rotatably carry a support ring 15 which is disposed immediately below guide drum 12. A downwardly and outwardly opening notch or recess 16 is formed in the outer periphery of support ring 15 and a lever 17 carries a latching roller 18 that is receivable in recess 16 to hold ring 15 against rotation. Rotatably mounted upon support ring 15 are four tape guiding rollers or pins 19, 20, 21 and 22 having their axes extending parallel to that of guide drum 12 and being spaced apart more or less equally about the guide drum and displaced radially outward with respect to the latter (FIGS. 2 and 4). The tape 13 which is to be wrapped around guide drum 12 for recording and reproducing purposes is contained within a cassette 41 which is hereinafter described in detail and which, as shown on FIGS. 2 and 4 contains laterally spaced apart tape guiding rollers 24 and 25 located at opposite sides of support ring 15 when the cassette is positioned on the tape recorder for operation of the latter.

Figure 3:
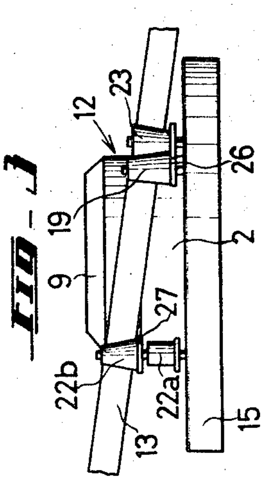
FIG. 3 is a side elevational view of the assembly of FIG. 1 with the tape in the condition illustrated by FIG. 2.
Figure 10:
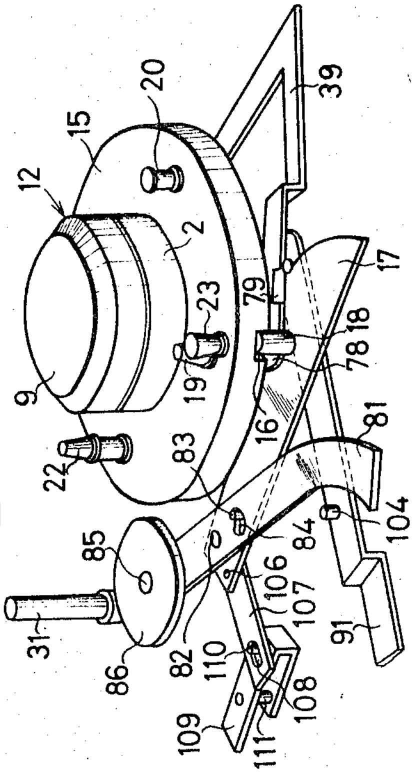
FIG. 10 is a detail perspective view showing a part of the mechanisms illustrated on FIG. 9.

The run of tape 13 between guide rollers 24 and 25 is shown on FIG. 2 to extend substantially tangentially with respect to the cylindrical surface to guide drum 12 and, when support ring 15 is held against rotation with latching roller 18 engaged in its recess 16, as shown on FIGS. 1 and 10, guide rollers 19 and 22 extending upwardly from the upper face 15*a* of the support ring are positioned between guide rollers 24 and 25 to receive the intervening run of tape 13 in the gaps or spaces *a* and *b* (FIG. 2) provided between guide drum 12 and guide rollers 19 and 22, respectively. The guide rollers 24 and 25 of tape cassette 41 are disposed at different levels so that, as shown particularly on FIG. 3, the run of tape 13 extending from roller 24 to roller 25 will be inclined upwardly from the horizontal.

Figure 5:
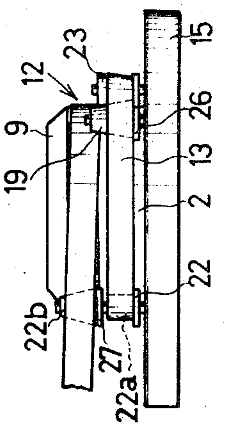
FIG. 5 is a view similar to that of FIG. 3, but showing the tape wrapped about the guide drum as on FIG. 4.

Also mounted on support ring 15 immediately adjacent guide roller 19 is an additional guide roller 23 and, where rollers 19 and 23 are mounted with their axes normal to the upper face 15*a* of the support ring, as shown, such rollers 19 and 23 are preferably oppositely tapered, that is, in the shape of a truncated cone and an inverted truncated cone, respectively, to alter the direction of tape travel. Alternatively, rollers 19 and 23 may be cylindrical but, in that case, the axes thereof should be tilted. The rollers 19, 20 and 21 and the additional guide roller 23 extend above support ring 15 a limited distance so as to be engageable with tape 13 only at the relatively low level of the tape corresponding to the guide roller 24, whereas the guide roller 22, as particularly shown on FIGS. 3 and 5, includes a cylindrical lower portion 22*a* and a tapered or truncated conical portion 22*b* which are respectively engageable with the tape substantially at the levels of the guide rollers 24 and 25. The guide roller 19 and the top part 22*b* of guide roller 22 have flanges 26 and 27, respectively, at their lower ends to vertically guide tape 13 and thereby precisely define the levels at which the tape extends to and from guide drum 12 when wrapped about the latter.

To the extent described above, the tape wrapping and unwrapping device according to this invention operates as follows:

With support ring 15 held in the position shown on FIG. 2 by the engagement of latching roller 18 in recess 16, a cassette 41 is mounted on the tape recorder and the run of the tape 13 between guide rollers 24 and 25 is inserted in the gaps *a* and *b* between guide drum 12 and guide rollers 19 and 22, respectively. Then, latching roller 18 is withdrawn from notch 16 and support ring 15 is rotated in the counterclockwise direction, indicated by the arrow A on FIG. 2, as hereinafter described in detail, with the latching roller 18 being returned to the recess 16 to halt such rotation of support ring 15 upon the completion of a single revolution. As a result of that single revolution of support ring 15 in the counterclockwise direction, tape 13 is wrapped about guide drum 12 to an angular extent of 360°, that is, in an alpha configuration, with the tape then running from guide roller 24 about guide rollers 20, 21, 22*a*, 23 and 19 tangentially to the lower portion of guide drum 12 and then tangentially from the upper portion of guide drum 12 over roller 22*b* to guide roller 25. Since the lower edge of tape 13 is precisely guided by flanges 26 and 27 on rollers 19 and 22*b*, it will be apparent that the angle formed between the wrap of the tape 13 about guide drum 12 and the horizontal plane in which magnetic head 10 is rotated is precisely and uniformly predetermined for each wrapping operation of the device.

After the tape 13 has been thus wrapped about guide drum 12 the recording or reproducing operation of the tape recorder may proceed with the tape being longitudinally advanced in the direction from guide roller 24 to guide roller 25, as hereinafter described, while magnetic head 10 is simultaneously rotated by the drive imparted to pulley 8 so that the magnetic head will traverse skew or oblique tracks on the tape.

When it is desired to unwrap the tape 13 from about guide drum 12, latching roller 18 is released from recess 16 and support ring 15 is rotated in the clockwise direction indicated by arrow B on FIG. 4 through one complete revolution, whereupon latching roller 18 is returned to recess 16 with the tape then being restored to the condition shown on FIG. 2, in which the cassette 41 can be easily replaced.

Figure 7:
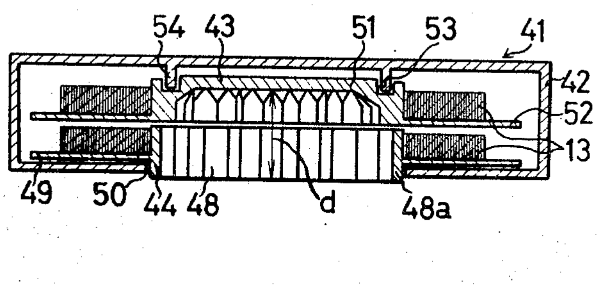
FIG. 7 is a vertical sectional view through a tape cassette intended for use in a magnetic tape recorder according to this invention.

Referring now to FIG. 7, it will be seen that each cassette 41 for use in connection with a magnetic tape recorder according to this invention generally comprises a casing 42 containing rotatable reels 43 and 44 for respectively taking up and supplying the tape 13 which has its opposite ends suitably secured to the reels 43 and 44, respectively. As shown, the takeup reel 43 is disposed above the supply reel 44 within casing 42 which further contains the previously mentioned guide rollers 24 and 25 (not shown on FIG. 7), with the tape running from the supply thereof wound on reel 44 around rollers 24 and 25 and then to reel 43 for winding on the latter. As shown, the lower tape supply reel 44 includes an internally toothed cylindrical gear portion or hub 48 having a radial flange 49 directed outwardly from the hub at a location slightly above the lower end of the latter. The tape supply is wound about hub 48 above flange 49, and the end portion 48*a* of hub 48 projecting below flange 49 is received in a freely rotatable manner in a circular opening 50 provided in the bottom of casing 42. The upper takeup reel 43 includes a cap-shaped hub 51 in the form of an internal gear, and a radial flange 52 directed outwardly from the bottom of hub 51, and the tape 13 is wound about the cylindrical outer surface of hub 51 above flange 52. Further, an annular, upwardly opening groove 53 is formed concentrically in the top surface of hub 51 and loosely receives a cylindrical flange 54 which depends from the top of casing 42 so as to guide takeup reel 43 in a freely rotatable manner.

Figure 8:
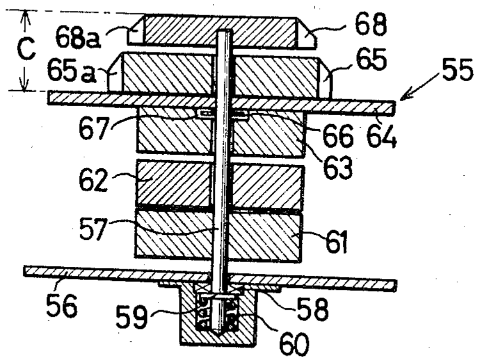
FIG. 8 is an axial sectional view through the mechanism shown on FIG. 6 for supporting and driving the tape cassette of FIG. 7.

Referring now to FIGS. 6 and 8, it will be seen that a mounting and driving assembly 55 for the tape cassette 41 may comprise a suitably positioned support plate 56 in which a vertical shaft 57 is journaled, at its lower end, by means of a bearing 58 carried by plate 56 and against which a collar 59 on the shaft is urged by a spring 60. Superposed one above the other on shaft 57 are wheels 61, 62 and 63, with the wheel 61 being secured to shaft 57 while wheels 62 and 63 are freely rotatable with respect to the shaft. Wheel 62 rests upon the upper surface of wheel 61 with a layer of frictional material being interposed therebetween so that wheels 61 and 62 constitute a slippable coupling for effecting rotation of shaft 57 in response to the rotation of wheel 62, as hereinafter described. A disk 64 and a gear 65 are superposed on wheel 63 so as to be rotatable with wheel 63 relative to shaft 57, and a flange 66 is provided on the upper end portion of shaft 57 and received in a recess 67 of wheel 63 to axially locate the assembly of wheel 63, disk 64 and gear 65 with wheel 63 being axially spaced from wheel 62. The upper end of shaft 57 projects above gear 65 and carries a gear 68 with is fixed to the shaft for rotation with the latter. As is shown on FIG. 8, the diameter of gear 68 is substantially smaller than that of gear 65 and, as shown on FIG. 7, the internal teeth or gearing of reel hubs 51 and 48 have a similar diametrical relationship for meshing with gears 68 and 65, respectively, when the tape cassette 41 is disposed over the cassette mounting and driving assembly 55. Since gear 68 is of smaller diameter than gear 65, it can freely pass through hub 48 of the lower supply reel 44 without interference from the internal teeth of hub 48. Further, the engagement of gears 65 and 68 with the internal teeth of reel hubs 48 and 51, respectively, is facilitated by providing the teeth of gears 65 and 68 with beveled upper ends, as at 65*a* and 68*a* on FIG. 8. Preferably, the axial location of gear 65 by flange or collar 66 on shaft 57 is selected so that the spacing of gear 68 from gear 65 will result in a distance C between the upper faces of gear 68 and disk 64 (FIG. 8) that is slightly larger than the distance *d* (FIG. 7) from the inner surface of the top of cap-shaped hub 51 to the lower end surface of hub 48, as measured when the tape cassette 41 is removed from the magnetic tape recorder, that is, when hub 51 is free to rest on hub 48. Thus, when tape cassette 41 is disposed on mounting and driving assembly 55 and has its casing 42 contacted and located by suitable locating surfaces or members (not shown) provided on the deck adjacent assembly 55, the lower end edge of hub 48 seats on disk 64 and gear 68 bears against the inner surface of the top of hub 51 to axially space takeup reel 43 from supply reel 44 and thereby permit their free rotation relative to each other.

During normal operation of the tape recorder for recording or reproducing signals on tape 13, the tape is driven at a predetermined speed in the direction to unwind from supply reel 44 by the cooperative action of a capstain 31 and pinch roller 32 (FIG. 9) between which the tape passes at a location intermediate guide roller 25 and takeup reel 43. During such operation of the recorder for recording or reproducing signals on the tape, wheel 62 is driven, as hereinafter described in detail, in the direction to rotate takeup reel 43 for winding of the tape on the latter. When thus rotated, the rotational speed of wheel 62 is far in excess of the rotational speed at which reel 43 needs to be rotated in order to takeup the tape being advanced by the cooperative action of capstain 31 and pinch roller 32. Thus, the rotary movement of wheel 62 is transmitted to wheel 61, with slippage at the frictional material therebetween, and reel 43 is rotated from wheel 61 by way of shaft 57 and gear 68 meshing with the internal teeth of hub 51 so as to takeup the tape as it is advanced and to maintain a suitable tension in the tape.

When the fast forwarding operation of the magnetic tape recorder is initiated, as hereinafter described in detail, pinch roller 32 is moved away from capstain 31 so that the tape 13 can pass freely therebetween, and wheel 61 is directly rotated, as hereinafter described, whereby to drive takeup reel 43 at the relatively high rotational speed of wheel 61 for effecting the rapid winding of the tape on reel 43.

When the rewinding operation of the magnetic tape recorder is initiated, that is, when it is desired to rewind the tape on supply reel 44 from takeup reel 43, the drive of wheel 61 or wheel 62 is interrupted and wheel 63 is rotated at relatively high speed, as hereinafter described in detail, with such rotation being transmitted through disk 64 and gear 65 meshing with the internal teeth of hub 48 for effecting relatively high speed rotation of supply reel 44 in the direction for rewinding the tape thereon.

Preferably, the diameters of the internal gearing provided within hubs 48 and 51 of the supply and takeup reels are made relatively large so that the driving forces applied thereto, as described above, will be smoothly transmitted to effect the steady rotation of reels 43 and 44. In order to achieve the foregoing, the internal gearing of hubs 48 and 51 should have diameters that are at least one-sixth, and preferably at least one-fourth, of the outer diameters of flanges 49 and 52 of the reels which, of course, represent the maximum diameters to which the tape can be wound on the reels.

Figure 9:
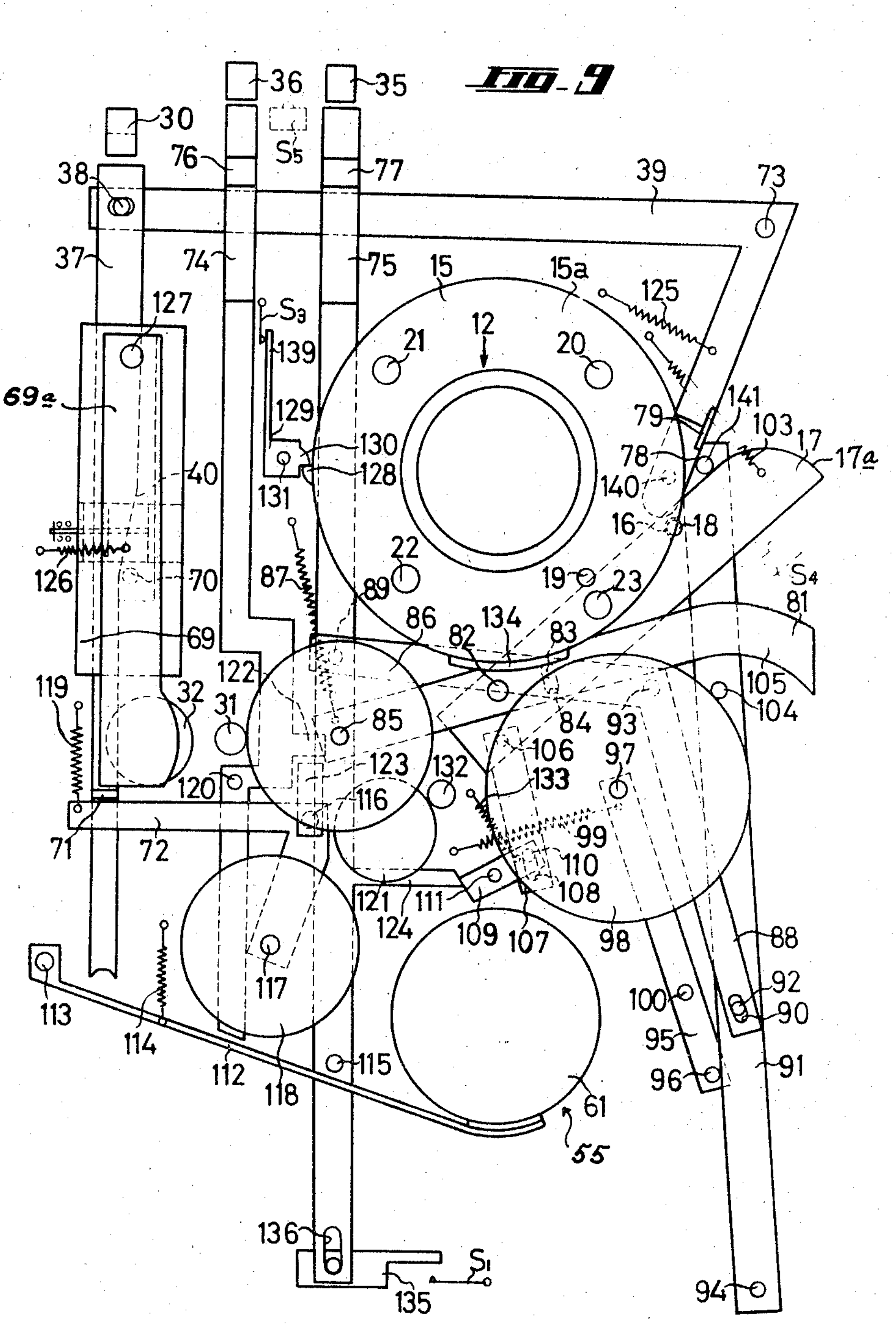
FIG. 9 is a plan view of mechanisms provided for effecting the various operations of the tape wrapping and unwrapping device according to this invention.
Figure 11:
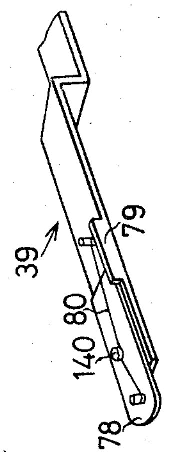
FIG. 11 is a detail perspective view of a portion of one of the elements appearing on FIG. 10.
Figures 12A, 12B, 12C, 12D, 12E, 12F:
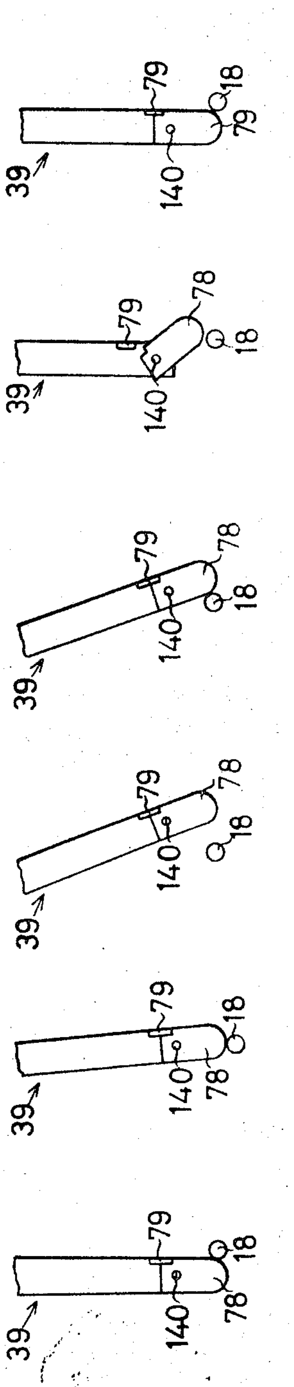
FIGS. 12A to FIG. 12F are diagrammatic plan views illustrating various operations of the element shown on FIG. 11.

Referring now to FIGS. 9 and 10, it will be seen that the lever 17 carrying latching roller 18 is pivotally supported on a pin 82 and is yieldably urged by a spring 103 to move latching roller 18 against the periphery of support ring 15 and hence into recess 16 when support ring 15 is rotationally positioned to register recess 16 with latching roller 18. In order to automatically release latching roller 18 from recess 16, and thereby permit rotation of support ring 15 for wrapping of the tape about guide drum 12 at the initiation of a recording or reproducing operation of the magnetic tape recorder, the latter includes a play button 30 which is depressed to initiate such operation and which, when depressed, acts against and displaces a rod 37 which is suitably guided for longitudinal movement. A bellcrank 39 supported intermediate its ends on a pivot pin 73 is coupled, at one of its ends, to rod 37, as by a pin and slot connection 38, and, at its other end, carries a pivot pin 140 on which an extension 78 of the bellcrank is pivotally mounted. The end portion of bellcrank 39 adjacent pivot pin 140 has a lug 79 projecting therefrom and being engageable by extension 78 to prevent pivoting of the extension 78 in one direction, that is, in the clockwise direction as viewed on FIG. 9, relative to bellcrank 39, while leaving extension 78 free to pivot relative to the bellcrank in the other direction. A torsional spring 80 (FIG. 11) is provided on pivot pin 140 and engages, at its ends, with anchor pins on extension 78 and bellcrank 39 for yieldably urging extension 78 to the position where it engages abutment or lug 79. As shown on FIGS. 9 and 10, in the normal position of bellcrank 39 to which it is urged by a spring 125 (FIG. 9), extension 78 projects under support ring 15 inwardly with respect to latching roller 18 and is of sufficient length so that roller 18 projects into the arcuate path of travel of the end of extension 78 when bellcrank 39 is rocked from such normal position in the counterclockwise direction, as viewed on FIG. 9, for example, in response to the longitudinal movement of rod 37 when play button 30 is depressed. During such outward movement of the end of extension 78 along an arcuate path, as particularly illustrated on FIGS. 12A, 12B and 12C, extension 78 acts against latching roller 18 to rock lever 17 in the clockwise direction, as viewed on FIG. 9, and thereby to release latching roller 18 from recess 16. However, as the outward movement of extension 78 continues, the arcuate path of travel of the end of extension 78 and the arcuate movement of roller 18 about pivot pin 82 results in the freeing of roller 18 from extension 78 so that spring 103 can again urge lever 17 to pivot in the direction for causing bearing of roller 18 against the periphery of support ring 15. Thus, latch roller 18 is only momentarily withdrawn from the periphery of ring 15 and is free to again engage in recess 16 for halting rotation of ring 15 when the latter has completed a single revolution, that is, has returned to its original position. Thereafter, when bellcrank 39 is released for return by spring 125 to its original position in the clockwise direction, as viewed on FIG. 9, extension 78 of the bellcrank pivots relative to the latter in passing over latching roller 18, as particularly shown on FIGS. 12D, 12E and 12F.

As shown on FIG. 9, the pinch roller 32 is rotatably supported by an arm 69*a* pivoted, as on a pin 127, on a stationary mounting plate 69 so that pinch roller 32 is movable toward and away from capstain 31, and a spring 126 is connected to arm 69 to urge the latter in the direction for moving the pinch roller away from capstain 31. As shown in broken lines, the longitudinally movable rod 37 has an inclined edge 40 which, in response to the longitudinal movement of rod 37 by depression of play button 30, acts against a pin 70 depending from arm 69*a* to rock the latter in the counterclockwise direction as viewed on FIG. 9, that is, in opposition to the spring 126, for moving pinch roller 32 against capstain 31. The rod 37 further has an abutment 71 projecting therefrom and being engageable with one end portion of a bellcrank 72 which carries, at its other end, a shaft 117 on which an idler wheel 118 is rotatably supported. Bellcrank 72 is pivotally mounted, intermediate its ends, on a shaft 116 and is displaceable along the latter shaft so as to selectively dispose idler wheel 118 either at the level of wheel 62 or the level of wheel 61 of the previously described mounting and driving assembly 55. Bellcrank 72 is normally disposed, for example, by a spring (not shown), at a level at which idler wheel 118 is engageable with wheel 62, and a spring 119 is connected with bellcrank 72 to urge the latter in the clockwise direction, as shown on FIG. 9, to a normal position where idler wheel 118 is spaced from assembly 55 and also from an idler wheel 121 which is continuously rotated by a shaft 132 connected with the motor (not shown on FIG. 9). However, when rod 37 is longitudinally displaced in response to depression of play button 30, abutment 71 causes angular displacement of bellcrank 72 in the counterclockwise direction, as viewed on FIG. 9, so that idler wheel 118 is moved into engagement with idler wheel 121 and also into peripheral engagement with wheel 62 of assembly 55.

A lever 81 (FIGS. 9 and 10) is pivotally mounted, intermediate its ends, on the pivot pin 82 supporting lever 17 and, at one of its ends, carries a shaft 85 on which an idler wheel 86 is rotatably mounted. Idler wheel 86 is dimensioned so that its periphery will continuously engage the base of capstain 31 which is suitably rotated from the motor, and a spring 87 is connected to lever 81 to urge the latter in the clockwise direction, as viewed on FIG. 9, and thereby bring the periphery of rotated idler wheel 86 into driving engagement with the periphery of support ring 15 for rotating the latter in the counterclockwise direction, that is, in the direction for wrapping the tape around guide drum 12 as previously described herein.. However, lever 81 is normally held in the position shown on FIG. 9, in which the periphery of idler wheel 86 is spaced from support ring 15 by the engagement of a pin 83 projecting from lever 17 in a slot 84 formed in lever 81. So long as lever 17 is positioned as shown on FIG. 9 with latch roller 18 engaging in recess 16, pin 83 engages against the upper end of slot 84 to hold lever 81 in the position shown, and spring 103 is sufficiently strong to overcome the force of spring 87 and thereby to hold idler wheel 86 away from the periphery of support ring 15. It will be apparent that, when lever 17 is displaced to release latching roller 18 from recess 16, as previously described, pin 83 moves toward the lower end of slot 84 whereby lever 81 is released to permit spring 87 to rock lever 81 in the direction for engaging idler wheel 86 with support ring 15.

A brake arm 112 is pivotally mounted at one end, as on a pin 113 and, at its other end, carries brake shoes which are respectively engageable with the periphery of wheels 61 and 63 of assembly 55. A spring 114 acts on arm 112 to urge the latter in the direction for engaging its brake shoes with wheels 61 and 63 and thereby halting the rotation of takeup reel 43 and supply reel 44. As shown on FIG. 9, brake arm 112 extends across the end of rod 37 remote from play button 30 so that, when rod 37 is longitudinally displaced in response to depression of the play button, rod 37 acts on arm 112 to rock the latter in the direction for freeing the brake shoes from wheels 61 and 63.

Movable generally parallel to rod 37 is a rod 74 which is longitudinally displaced, in the downward direction as viewed on FIG. 9, in response to the depression of a fast forward button 36. When thus longitudinally displaced, rod 74, at its end remote from button 36, acts against brake arm 112 to rock the latter in the direction for freeing its brake shoes from wheels 61 and 63. Rod 74 further has a pin 120 projecting therefrom and engageable with bellcrank 72, in response to the longitudinal displacement of rod 74, for pivotting bellcrank 72 in the direction opposed to the action of spring 119 and thereby moving idler wheel 118 against idler wheel 121 and assembly 55. A camming member 122, shown in broken lines on FIG. 9, extends from rod 74 and, upon longitudinally displacement of the latter, engages over an arm 123 extending from bellcrank 72 so as to depress the latter to the level at which idler wheel 118 will be engageable with the periphery of wheel 61 of assembly 55 for effecting the direct fast forward rotation of takeup reel 43. Rod 74, at its end portion adjacent button 36, is formed with a projecting portion or abutment 76 which, in response to longitudinal displacement of rod 74 by depression of button 36, acts on bellcrank 39 to rock the latter in the direction for effecting release of latching roller 18 from recess 16. Thus, at the initiation of the fast forward operation, as in the regular play operation, support ring 15 is passed through one revolution to wrap the tape about guide drum 12.

In order to effect rewinding of the tape 13 from takeup reel 43 onto supply reel 44, the apparatus shown on FIG. 9 further includes a lever 95 pivotally mounted intermediate its ends on a pin 100 and carrying a shaft 97 at one end on which a driving wheel 98 is rotatably supported. A spring 99 is connected to lever 95 to urge the latter in the counterclockwise direction as viewed on FIG. 9, and thereby to move driving wheel 98 from its inoperative position shown on FIG. 9 into peripheral engagement with the motor-driven shaft 132 and simultaneously with the periphery of wheel 63 of assembly 55. The movement of lever 95 from its illustrated position is normally prevented by the engagement of a pin 96 carried by the end of lever 95 remote from shaft 97 with a lever 91 which is pivotally supported at one end on a pin 94. The lever 91 is normally maintained in the illustrated position, where it blocks movement of the pin 96, by the engagement of a pin 92 carried by lever 91 in a slot 90 formed in one end portion of a bellcrank 88 which is pivotally supported intermediate its ends on a pin 93 and connected, at its opposite end, as by a pin 89 with a rod 75 which is longitudinally displaceable generally parallel to the rods 37 and 74 in response to the depressing of a rewind button 35. When rod 75 is thus longitudinally displaced by depressing of rewind button 35, bellcrank 88 is rocked in the counterclockwise direction, as viewed on FIG. 9, and the resulting pivotal movement of lever 91 moves the latter away from pin 96 so that lever 95 can be rocked by spring 99 in the direction to engage the periphery of driving wheel 98 with driven shaft 132 and the periphery of wheel 63 for rotating supply reel 44 in the direction to rewind the tape thereon. Rod 75 is formed with a projecting portion 77 which, in response to longitudinal displacement of rod 75 by depressing of rewind button 35, acts on bellcrank 39 to pivot the latter in the direction for releasing latching roller 18 from recess 16, as previously described. However, the resulting pivoting of lever 17 does not free lever 81 for engagement of idler wheel 86 with the periphery of support ring 15, by reason of the fact that a pin 104 on lever 91 is moved to a blocking position with respect to a curved end portion 105 of lever 81 upon the pivotal movement of lever 91 that results from the longitudinal displacement of rod 75.

As shown on FIGS. 9 and 10, a link 107 is pivotally connected at one end, as by a pin 106, with lever 17 and has a longitudinal slot 108 in its other end portion receiving a pin 110 projecting from one end of a braking lever 109 which is pivotally mounted, intermediate its ends, on a pivot pin 111. A spring 133 is connected to braking lever 109 to urge the latter in the counterclockwise direction as viewed on FIG. 9. An abutment 124 (FIG. 9) extends laterally from rod 75 and, so long as rod 75 is in its normal position as shown, abutment 124 is engageable with the end of braking lever 109 remote from pin 110 to prevent pivoting of braking lever 109 by spring 133 from the position shown. However, when rod 75 is longitudinally displaced in response to depression of rewind button 35, abutment 124 moves away from lever 109 so that, when lever 17 is pivoted by the action of extension 78 of bellcrank 39 against pin 18, and further by the action of a pin 141 on lever 91 against an arcuate end edge 17*a* of lever 17, the resulting relatively large movement of link 107 in the upward direction as viewed on FIG. 9 permits spring 133 to pivot braking lever 109 in the counterclockwise direction, as viewed on FIG. 9, so as to engage its end remote from pin 110 with the periphery of wheel 61 of assembly 55 whereby to initially prevent rotation of takeup reel 43 in the direction for unwinding the tape therefrom. By reason of the arcuate nature of the edge 17*a* of lever 17 against which pin 141 is intended to act, it will be apparent that, upon full angular displacement of lever 91 from the position shown, lever 17 is freed of pin 141 so as to be returned by spring 103 to the position where latching roller 18 again engages against the periphery of support ring 15. Such return movement of lever 17 will cause link 107 to rock braking lever 109 back to the position shown on FIG. 9, that is, to free braking lever 109 from wheel 61 so that, thereafter, takeup reel 43 is freed to rotate in the direction for unwinding the tape therefrom in response to the rotation of supply reel 44 in the rewinding direction by reason of the engagement of driving wheel 98 with wheel 63.

However, it will be seen that, during the initial phase of the rewinding operation, that is, so long as braking lever 109 is positioned to prevent rotation of takeup reel 43, the rotation of supply reel 44 in the rewinding direction will produce a tension or pull in the tape 13 in the direction toward guiding roller 24 on FIG. 4 and, since support ring 15 is then free to rotate, by reason of the disengagement of latching roller 18 from recess 16, the tension or pull will cause rotation of ring 15 in the direction of the arrow B on FIG. 4 so as to unwrap the tape from around guiding drum 12. During the initial and concluding phases of the single revolution of support ring 15 in the direction for unwrapping the tape from guide drum 12, the rotation of support ring 15 will be assisted by the engagement of the periphery of driving wheel 98 with a rubberized layer 134 provided on only a portion of the periphery of ring 15. Upon the completion of a single revolution of ring 15 for unwrapping the tape from guide drum 12, latching roller 18 again engages in recess 16 to prevent further turning of ring 15 and, since braking lever 109 has then been released from wheel 61, the drive of wheel 63 by driving wheel 98 and the resulting rotation of supply reel 44 is then effective to rewind the tape on reel 44 as such tape unwinds from takeup reel 43, with the tape being then arranged relative to drum 12 as shown on FIG. 2.

It will also be seen that rod 75 carries a pin 115 (FIG. 9) which is effective to act against brake arm 112 for releasing the brake shoes carried by such arm from wheels 61 and 63 so long as rod 75 is longitudinally displaced in response to depressing of rewind button 35.

Figure 13:
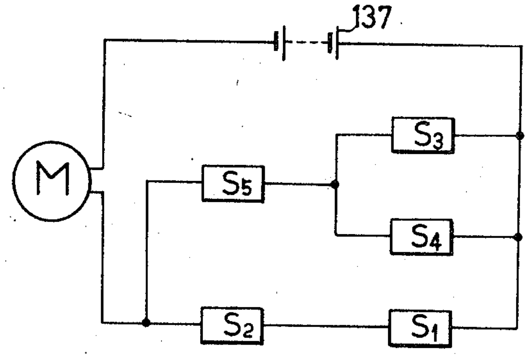
FIG. 13 is a circuit diagram of an electrical control circuit included in the device according to this invention.

Referring now to FIG. 13, it will be seen that the motor M for effecting rotation of shaft 7 through pulley 8 thereon (FIG. 1) and also for effecting rotation of capstan 31 and drive shaft 132 is adapted to be alternatively energized from an electrical source 137 through a first circuit having switches $S_1$ and $S_2$ connected in series therein, or through a second circuit which is in parallel with the first circuit and which includes two parallel switches $S_3$ and $S_4$ and a switch $S_5$ in series with the parallel switches $S_3$ and $S_4$.

Figure 14:
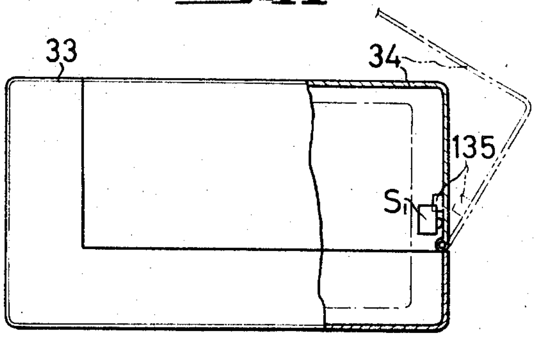
FIG. 14 is a side elevational view of a casing within which a magnetic tape recorder embodying this invention may be continued.

As shown on FIG. 14, the magnetic tape recorder according to this invention preferably has a housing or casing 33 with a movable lid or cover 34 which can be moved between the closed position shown in full lines and the open position shown in broken lines. The switch $S_1$ is of a normally closed type, and such switch is opened when the cover 34 is in its closed position, for example, as by a switch actuator 135 which is fixed or connected to the cover 34. As shown on FIGS. 2 and 4, the switch $S_2$ is a normally open switch mounted adjacent the guide roller 24, and that switch is closed by the tape 13 when the latter extends between guide rollers 20 and 24 (FIG. 4), that is, only when the tape is wrapped about guide drum 12.

Switch $S_3$ is a normally closed switch and is open only when ring 15 has completed one revolution in the direction for wrapping tape 13 about guide drum 12. In the embodiment of FIG. 9, such actuation of switch $S_3$ is effected by providing a switch actuating arm 129 which is pivotally mounted adjacent the periphery of ring 15, as on a pin 131, and has a contact of the switch connected with an end portion 139 of actuating arm 129. Complementary noses 128 and 130 project from the periphery of ring 15 and from actuating arm 129 and have flat surfaces that contact each other, as on FIG. 9, when, prior to the wrapping of the tape about guide drum 12, ring 15 is in its initial position with latching roller 18 engaging in recess 16. Extending from such mutually engageable flat surfaces of noses 128 and 130 are arcuate surfaces that engage each other at the completion of a single revolution of ring 15 in the direction for wrapping the tape about guide drum 12, for example, as shown with respect to another embodiment on FIG. 16. Such engagement of the arcuate surfaces of noses 128 and 130 causes rocking of actuating arm 129 in the clockwise direction, as viewed on FIG. 9, whereby to open switch $S_3$. Of course, when ring 15 is rotated to unwrap the tape 13 from about guide drum 12, noses 128 and 130 return to the relative positions shown on FIG. 9 and switch $S_3$ is again closed.

Switch $S_4$ is a normally closed switch and, as shown in broken lines on FIG. 9, is suitably mounted adjacent lever 17 so as to be actuated by lever 17 and thereby placed in its open position when lever 17 is rocked in the direction to release latch roller 18 from recess 16.

The switch $S_5$ shown in broken lines on FIG. 9 is a normally open switch which is closed by suitable conventional mechanisms (not shown) whenever any one of the buttons 30, 35 and 36 is depressed to effect the corresponding operation of the tape recorder. Each of the operation selecting buttons 30, 35 and 36 is of a conventional type having suitable mechanisms associated therewith to retain the respective button in its depressed condition after depressing thereof, and to release the button for return of the respective rod 37, 74 or 75 to the position shown on FIG. 9 only when the usual stop button (not shown) is depressed for releasing the previously depressed operation selecting button 30, 35 or 36.

Although the functions and specific operations of the various parts of the above described embodiment of this invention have been referred to in the detailed description of such parts, the overall operation of the magnetic tape recorder will now be summarized:

After installing the tape cassette 41 on the mounting and driving assembly 55, depressing of the play button 30, for initiating either a recording or a reproducing operation which is selected by another control of the recorder results in the closing of switch $S_5$ and, since switch $S_3$ is then in its closed condition, a circuit for energizing the motor M is thereby completed through switches $S_3$ and $S_5$. Such operation of motor M causes rotation of capstan 31 and drive shaft 132 and also of the pulley 8 secured on the shaft 7 for rotating the magnetic head 10. The rotation of capstan 31 causes rotation of idler wheel 86, and the rotation of drive shaft 132 causes rotation of idler wheel 121. Further, the depressing of play button 30 effects longitudinal displacement of rod 37 and, as previously described, such displacement of rod 37 effects rocking of bellcrank 39 for momentarily releasing latching roller 18 from recess 16 and for rocking lever 17 so as to permit lever 81 to rock for effecting engagement of driven idler wheel 86 with the periphery of ring 15 whereby the latter is turned through one complete revolution to wrap the tape 13 about guide drum 12, as shown on FIG. 4. At the completion of a full revolution of ring 15 for wrapping the tape about guide drum 12, latching roller 18 reengages in recess 16 to stop the rotation of ring 15 and switch $S_3$ is open as previously described. However, at the time of the opening of switch $S_3$, lever 17 has returned to the position shown on FIG. 9 so that switch $S_4$ is closed and the operation of motor M continues through the circuit provided by closed switches $S_4$ and $S_5$. The displacement of rod 37 in response to depressing of play switch 30 further causes the movement of brake arm 112 in the brake-releasing direction, the movement of bellcrank 72 in the direction to engage idler wheel 118 with idler wheel 121 and wheel 62 and further the movement of pinch roller 32 towards capstan 31. Thus, wheel 61 of assemble 55 is released for rotation in response to the rotation of wheel 62 by idler wheel 118 for rotating takeup reel 43 through gear 68 and the tape is advanced around guide drum 12 by the cooperative action of capstan 31 and pinch roller 32. Thus, after the initial wrapping of the tape about guide drum 12, the tape is advanced by unwinding from supply reel 44 and winding on takeup reel 43, and magnetic head 10 is rotated to record or reproduce signals in skew or oblique tracks on the tape wrapped about the guide drum. Upon the wrapping of the tape about guide drum 12, switch $S_2$ is closed, as shown on FIG. 2, but switch $S_1$ in series with switch $S_2$ remains open so long as the cover or lid 134 is in its closed position. Thus, during the recording or reproducing operation, motor M is operated only so long as switch $S_5$ and one or the other of switches $S_3$ and $S_4$ are simultaneously closed. The operation of motor M is halted when switch $S_5$ is opened in response to the actuation of the stop button which releases play button 70 and rod 37 to the position shown on FIG. 9. The return of rod 37 to the positions shown on FIG. 9 permits brake arm 112 to move to its braking position, bellcrank 72 to pivot in the direction for spacing idler wheel 118 from wheel 62, and movement of pinch roller 32 away from capstan 31, whereby the advancement of the tape and the winding thereof on takeup reel 43 are immediately halted.

If play button 30 is depressed to initiate a recording or reproducing operation at a time when the tape is already wrapped about guide drum 12, the displacement of rod 37 and consequent rocking of bellcrank 39 for momentarily releasing latching roller 18 from recess 16 and momentarily rocking lever 17 to permit engagement of idler wheel 86 with ring 15 cannot produce further rotation of ring 15, that is, cannot produce a further wrapping of the tape about drum 12, as the rocking of lever 17 opens switch $S_4$ and, as switch $S_3$ is already opened, no circuit is completed for operating motor M until lever 17 returns to the position shown on FIG. 9 where it spaces idler wheel 86 from ring 15 at the same time that it permits closing of switch $S_4$. Thus, during successive recording or reproducing operations, the tape is wrapped about guide drum 12 only during the first such operation and, during the succeeding operations, the apparatus only operates as described to advance the tape between capstan 31 and pinch roller 32 and simultaneously to wind the tape on takeup reel 43.

When the fast forward button 36 is depressed to close switch $S_5$ and to displace rod 74, the tape is initially wrapped about guide drum 12 in the manner previously described, if that has not been done before, and bellcrank 72 is both rocked and displaced in the direction parallel to its pivoting axis to engage idler wheel 118 with idler wheel 121 and with wheel 61, whereby to effect the high-speed rotation of takeup reel 43 while the tape passes freely between capstan 31 and pinch roller 32 which remain spaced apart. During such fast forwarding operation, brake arm 112 is displaced by rod 74 for releasing the brakes from wheels 61 and 63, and the fast forwarding operation continues so long as the circuit for operating motor M is completed through switches $S_4$ and $S_5$, that is, until switch $S_5$ is opened upon the actuation of the stop button which releases fast forward button 36 and rod 74 for return to the positions shown on FIG. 9. Return of rod 74 to the position shown on FIG. 9 permits brake arm 112 to apply the brakes for stopping rotation of wheels 61 and 63 and further permits bellcrank 72 to return to the position where idler wheel 118 is spaced from wheel 61.

Upon depressing rewind button 35 to close switch $S_5$ and displace rod 75, motor M is initially operated through the circuit provided by closed switches $S_4$ and $S_5$. The displacement of rod 75, as described above, causes release of latching roller 18 from recess 16, the rocking of lever 17 to apply braking lever 109 to wheel 61 to prevent initial rotation of takeup reel 43 and simultaneously the engagement of driving wheel 98 with shaft 132 and with wheel 63 so that the pull that results on tape 13 causes turning of ring 15 in the direction for unwrapping the tape from guide drum 12. During the initial increment of the rotation of ring 15 for unwrapping the tape from guide drum 12, the arcuate surfaces of noses 128 and 130 are separated from each other so that switch $S_3$ can return to its closed condition for continuing the operation of motor M even though switch $S_4$ is opened in response to the rocking of lever 17. When ring 15 has completed a single revolution to unwrap the tape from guide drum 12, latching roller 18 returns to recess 16 to prevent further rotation and, simultaneously, braking lever 109 is disengaged from wheel 61 so that the continued rotation of wheel 63 by driving wheel 98 is then effective to achieve the rewinding of the tape on supply roll 44. When the stop button is actuated to permit return of rewind button 35 and rod 75 to the positions shown on FIG. 9, switch $S_5$ is opened to halt operation of motor M, driving wheel 98 is moved away from wheel 63 and shaft 132, and pin 115 moves away from brake arm 112 to permit the latter to apply the brakes to wheels 61 and 63 for halting the rewinding of the tape.

As shown on FIG. 9, the actuating member 135 for the switch $S_1$ which is connected or fixed to the cover or lid 34 is further connected with arm 75, as by a pin and slot connection 136 so that, when the cover 34 is closed, such connection 136 will not interfere with the longitudinal displacement of rod 75 in response to depressing of the rewind button 35. However, when cover 34 is opened to close the normally opened switch $S_1$, the corresponding movement of the switch actuator 135 effects displacement of rod 75, in the downward direction as viewed on FIG. 9. Such displacement of rod 75 in response to opening of the cover or lie 34 initiates the same operations as have been described above in connection with the rewind operation of the tape recorder. However, in this instance, the motor M is operated through the circuit consisting of the switch $S_1$ closed in response to the opening of the door or lid and the switch $S_2$ which is closed in response to the fact that the tape 13 is then wrapped about guide drum 12. Since rewind button 35 has not been depressed, switch $S_5$ will remain open. Thus opening of the cover or lid 34 will only cause the turning of ring 15 through one complete revolution in the direction for unwrapping the tape from guide drum 12. When the tape has been thus unwrapped from the guide drum, switch $S_2$ will open to halt the operation of motor M, and thus no rewinding of the tape will occur upon the release of brake lever 109 from wheel 61.

Referring now to FIGS. 15 and 16, it will be understood that, in connection with the modification of the previously described magnetic tape recorder as there shown, the switches $S_3$ and $S_4$ may be eliminated, in which case one circuit for operating the motor M is provided through the switch $S_5$ and a parallel circuit for operating the motor is provided through the series connected switches $S_1$ and $S_2$. In the modification of FIGS. 15 and 16, the double wrapping of the tape about guide drum 12 is prevented by providing an arm 138 extending from the pivoted member 129 into the path of travel of the shaft 85 of idler wheel 86 in the direction toward the periphery of support ring 15. So long as the flat faces of noses 128 and 130 engage each other, as shown on FIG. 15 which corresponds to the condition of FIG. 2 in which the tape is not wrapped about drum 12, arm 138 is spaced inwardly from shaft 85 sufficiently to permit the movement of idler wheel 86 into engagement with the periphery of ring 15. However, when the tape has been wrapped about drum 12, as shown on FIG. 4, the curved surfaces of noses 128 and 130 engage each other and the consequent pivoting of member 129 moves arm 138 outwardly away from the periphery of ring 15, as shown on FIG. 16, thereby to engage shaft 85 and prevent the contact of idler wheel 86 with ring 15 during the initial phase of a recording or reproducing operation.

In the described embodiment, the ring 15 has been shown as being rotatable independently of the lower guide drum portion 2, which is fixed, but it is to be understood that such lower guide drum portion 2 may be made rotatable with the ring 15.

Although illustrative embodiments of this invention have been described in detail herein with reference to the drawings, it is to be understood that the invention is not limited to those precise embodiments, and that various changes and modifications may be effected therein by one skilled in the art without departing from the scope or spirit of this invention.

What is claimed is:

1. In a magnetic tape recorder including a guide drum defining a generally cylindrical surface, magnetic head means rotatable about the axis of said surface in a plane between the ends of the latter, spaced guide means for a magnetic tape arranged so that a run of the tape therebetween is substantially tangential to said cylindrical surface and is inclined with respect to said plane of rotation of the head means, and drive means for rotating said head means and for longitudinally advancing the tape between supply and takeup reels therefor; a device operable selectively to wrap the tape between said guide means about said drum and to upwrap the tape from said drum, said device comprising a plurality of tape guiding members spaced radially from said drum, rotatable disklike support means mounting said guiding member for movement about said drum in an orbital path into which only a portion of said run projects, means operable selectively to effect a predetermined rotational movement of said support means in one direction during which said guiding member engages said portion of the tape about said drum to a predetermined angular extent, and means operable selectively to effect said predetermined rotational movement of the support means in the opposite direction to unwrap the tape from said drum.

2. A magnetic tape recorder according to claim 1, in which control means are provided which are actuable to cause operation of said drive means for rotating the head means and of said drive means for advancing the tape in the direction from said supply reel to said takeup reel during recording and reproducing operations of the recorder, and further to cause operation of said means to effect rotational movement of said support means in said one direction during an initial period of said recording and reproducing operations.

3. A magnetic tape recorder according to claim 2, in which means are provided to prevent operation of said means to effect rotational movement of the support means in said one direction in the event that the tape is already wrapped about said drum.

4. A magnetic tape recorder according to claim 2, in which control means are provided which are actuable to cause operation of said drive means for advancing the tape in the direction from said takeup reel to said supply reel during rewinding operation of the recorder, and further to cause operation of said means to effect rotational movement of said support means in said opposite direction for unwrapping the tape from said drum during an initial period of said rewinding operation.

5. A magnetic tape recorder according to claim 2, in which a casing is provided with a cover movable between open and closed positions, and control means are provided responding to the opening of said cover while the tape is wrapped about said drum to cause operation of said means to effect rotational movement of said support means in said opposite direction for unwrapping the tape from said drum.

6. A magnetic tape recorder according to claim 1, in which said support means carries at least one additional tape guiding member spaced radially from said drum and also spaced said one guiding member, said additional guiding member includes first and second parts respectively engageable with said portion of the tape run and with another portion of the tape run upon movement of said additional guiding member in an orbital path in response to rotation of said support means in said one direction, and said second part of the additional guiding member and the first-mentioned guiding member have flanges engageable with said tape at a longitudinal edge of the latter to precisely determine the angle with respect to said plane at which the tape is wrapped on said drum.

7. A magnetic tape recorder according to claim 1, in which said takeup and supply reels are contained in a cassette adapted to be supported by a mounting and driving assembly, said assembly includes slip clutch means having a driving member and a driven member to be coupled with said takeup reel and being frictionally engaged to said driving member, and a drive wheel to be coupled with said supply reel, and said drive means for advancing the tape includes a capstan and a pinch roller engageable therewith and being operable to advance the tape in the direction from said supply reel to said takeup reel and rotary means selectively engageable with said driving and driven members of the slip clutch means and with said drive wheel so as to wind the tape on said takeup reel and on said supply reel, respectively.

8. A magnetic tape recorder according to claim 7, in which control means are provided which are actuable for a play operation of the recorder to cause operation of said drive means for rotating the head means, operation of said capstan and pinch roller to advance the tape to said takeup reel and engagement of said rotary means with said driving member so as to rotate said takeup reel in its tape-winding direction through said slip-clutch means, and further to cause operation of said means to effect rotational movement of said support means in said one direction for wrapping the tape about said drum during an initial period of said play operation.

9. A magnetic tape recorder according to claim 8, in which control means are provided which are actuable for fast forward operation of the recorder to cause engagement of said rotary means directly with said driven member, whereby to effect relatively rapid rotation of said takeup reel in its tape winding direction.

10. A magnetic tape recorder according to claim 8, in which means are provided to prevent operation of said means to effect rotational movement of said support means in said one direction in response to actuation of said control means in the event that the tape is already wrapped about the drum.

11. A magnetic tape recorder according to claim 10, in which said means to effect rotational movement of the support means in said one direction includes an electric motor, an electric circuit for operating said motor including a first switch which is closed upon actuation of said control means and which is in series with parallel connected second and third switches, said second switch being opening in response to the rotation of said support means in said one direction for wrapping of the tape about said drum, and said third switch being opened during said initial period of said play operation.

12. A magnetic tape recorder according to claim 11, in which a casing is provided with a cover movable between open and closed positions, said motor is also operable to cause operation of said means to effect rotational movement of said support means in said opposite direction for unwrapping the tape from said drum, and an alternate circuit for operating said motor includes a fourth switch which is closed only in response to the tape being wrapped about the drum and a fifth switch in series with said fourth switch and being closed only in response to the movement of said cover to said open position.

13. A magnetic tape recorder according to claim 7, in which control means are provided which are actuable for a rewind operation of the recorder to cause engagement of said rotary means with said drive wheel, whereby to urge rotation of said supply reel in its tape winding direction, and further to brake rotation of said takeup reel in its tape unwinding direction during an initial period of said rewind operation so that the resulting pull on the tape wrapped about said drum will cause said rotation of said support means in said opposite direction from said drum.

14. A magnetic tape recorder according to claim 1, in which latching means are normally engaged to hold said support means against rotation in a predetermined position, and said latching means is released upon operation of said means to rotate the support means in said one direction and said opposite direction.

15. A magnetic recording and/or reproducing apparatus adapted to automatically engage a magnetic tape with a rotary head, said apparatus comprising;

a. a cylindrical tape guide drum having at least one rotary head,
b. a rotatable ring member substantially surrounding the cylindrical surface of said drum,
c. a plurality of engaging means mounted on said ring member and spaced from each other, at least one of said engaging means being adapted to engage the magnetic tape at the start of active condition of said apparatus, and
d. means for rotating said ring member to move all of said engaging means in the same annular direction in arcuate paths about at least a portion of the periphery of said drum, during which movement said engaging means engage the magnetic tape to guide the same into engagement with said drum for scanning by said rotary head.

16. A magnetic recording and/or reproducing apparatus as in claim 15, wherein all of said engaging means move simultaneously.

17. A magnetic recording and/or reproducing apparatus as in claim 15, wherein said rotatable ring member is a ring-shaped plate.

18. A magnetic recording and/or reproducing apparatus as in claim 15, wherein said rotatable ring member is rotated substantially with a virtual axis at the center of ring.

19. A magnetic recording and/or reproducing apparatus as in claim 18, wherein said engaging means sequentially engage the magnetic tape during said movement in said arcuate paths.

20. A magnetic recording and/or reproducing apparatus as in claim 19, wherein said engaging means operate to determine a running path for the magnetic tape in the operating condition of said apparatus.

21. A magnetic recording and/or reproducing apparatus adapted to automatically engage a magnetic tape with a rotary head, said apparatus comprising;

a. a cylindrical tape guide drum having at least one rotary head,
b. a rotatable disclike member surrounding the cylindrical surface of said drum, c. at least one engaging means mounted on said rotatable disclike member and adapted to engage the magnetic tape at the start of the active condition of the said apparatus, d. and means for rotating said rotatable disclike member to move said engaging means in an arcuate path about at least a portion of the periphery of said drum during which movement said engaging means engage the magnetic tape to guide the same into engagement with said drum for scanning by said rotary head.

22. Apparatus in accordance with claim 21 wherein the diameter of said disclike member is greater than the diameter of said drum.

23. Apparatus in accordance with claim 21 wherein said arcuate path is concentric with the path of travel of said head.

24. Apparatus in accordance with claim 15 wherein said ring member is mounted concentrically with respect to said drum and the diameter of said ring member is greater than the diameter of said head.

25. In a magnetic tape recorder and/or reproducer including a guide drum defining a generally cylindrical surface, magnetic head means rotatable about the axis of said surface in a plane between the ends of the latter, and drive means for rotating said head means and for longitudinally advancing the tape between supply and takeup reels therefor; a device operable selectively to wrap the tape between said reels about said drum and to unwrap the tape from said drum, said device comprising a plurality of tape guiding members spaced radially from said drum, rotatable disclike support means mounting said guiding member for movement about said drum in an orbital path into which only a portion of said run projects, means operable selectively to effect a predetermined rotational movement of said support means in one direction during which said guiding member engages said portion of the tape about said drum to a predetermined angular extent, and means operable selectively to effect said predetermined rotational movement of the support means in the opposite direction to unwrap the tape from said drum.

* * * * *